US009397853B2

(12) United States Patent
Derozard (10) Patent No.: US 9,397,853 B2
(45) Date of Patent: Jul. 19, 2016

(54) SYSTEM FOR BROADCASTING TARGETED DATA (75) Inventor: Jerome Derozard, Paris (FR)

(73) Assignee: CYBRONICS SASU, Paris (FR)

( * ) Notice: Subject to any disclaimer, the term of this patent is extended or adjusted under 35 U.S.C. 154(b) by 513 days.

(21) Appl. No.: 13/819,800

(22) PCT Filed: Aug. 19, 2011

(86) PCT No.: PCT/FR2011/051936
§ 371 (c)(1),
(2), (4) Date: Feb. 28, 2013

(87) PCT Pub. No.: WO2012/028803
PCT Pub. Date: Mar. 8, 2012

(65) Prior Publication Data
US 2013/0166699 A1 Jun. 27, 2013

(30) Foreign Application Priority Data

Aug. 30, 2010 (FR) ...................................... 10 56838

(51) Int. Cl.
G06F 15/16 (2006.01)
H04L 12/28 (2006.01)
H04L 29/08 (2006.01)
H04W 8/00 (2009.01)
H04W 40/24 (2009.01)

(52) U.S. Cl.
CPC ........ *H04L 12/2825* (2013.01); *H04L 12/2807* (2013.01); *H04L 12/2827* (2013.01); *H04L 67/02* (2013.01); *H04W 8/005* (2013.01); *H04W 40/24* (2013.01); *H04W 40/248* (2013.01)

(58) Field of Classification Search
CPC .. H04L 12/2807; H04W 8/005; H04W 40/24; H04W 40/248

USPC .......................................................... 709/219
See application file for complete search history.

(56) References Cited

U.S. PATENT DOCUMENTS 6,654,720 B1 * 11/2003 Graham et al. ................ 704/270
2007/0043829 A1 * 2/2007 Dua .............................. 709/219

(Continued)

FOREIGN PATENT DOCUMENTS

WO 2008013379 A2 1/2008
WO 2008150815 A2 12/2008

OTHER PUBLICATIONS

International Search Report issued Dec. 23, 2011, re: PCT/FR2011/051936; citing: US 2008/133970 A1, WO 2008/013379 A2 and WO 2008/150815 A2.

*Primary Examiner* — Richard G Keehn
(74) *Attorney, Agent, or Firm* — Cantor Colburn LLP (57) ABSTRACT The present invention relates to a system (100) for broadcasting targeted information for a home network (RD) to which at least one electronic device (4) including a processing means is connected, said broadcasting system including: at least one detector agent (1) for detecting a predefined event ($E_{id}$), said at least one detector agent (1) being arranged on the at least one electronic device (4); at least one selector agent (2) for selecting an action ($A_{id}$) to be performed, the at least one selector agent (2) being arranged on the at least one electronic device (4); and at least one broadcasting agent (3) for broadcasting targeted information content (Cid) for an end user (5), the at least one broadcasting agent (3) being arranged on the at least one electronic device (4). The detector (1), selector (2) and broadcasting (3) agents perform tasks in separate execution contexts on a processing means of the at least one electronic device (4) connected to the home network (RD).

14 Claims, 4 Drawing Sheets

(56) References Cited

U.S. PATENT DOCUMENTS

| | | | |
|---|---|---|---|
| 2007/0177511 A1* | 8/2007 | Das et al. | 370/238 |
| 2007/0274232 A1* | 11/2007 | Axelsson et al. | 370/254 |
| 2008/0133970 A1* | 6/2008 | Son et al. | 714/26 |
| 2009/0143018 A1* | 6/2009 | Anderson et al. | 455/67.11 |
| 2010/0008341 A1* | 1/2010 | Ulupinar et al. | 370/338 |
| 2010/0014529 A1* | 1/2010 | Takechi et al. | 370/401 |
| 2010/0189011 A1* | 7/2010 | Jing et al. | 370/254 |
| 2010/0191968 A1* | 7/2010 | Patil et al. | 713/170 |

* cited by examiner

SYSTEM FOR BROADCASTING TARGETED DATA

TECHNICAL FIELD

The present invention relates to a system for broadcasting targeted information for a home network connected to a remote network, such as the Internet, at least one electronic device being able to be connected to said home network, as well as a method for implementing such a system.

BRIEF DISCUSSION OF RELATED ART

With the generalization of home networks of the Wi-Fi, Bluetooth, Zigbee, Ethernet or PLC (PowerLine Communication) type and compatible electronic devices used by the general public, a new generation of Internet services is developing that can be used without necessarily using a computer or smartphone.

The list of devices connected in this way includes radios and television sets, recording and audiovisual broadcasting equipment such as video recorders, DVD/Blu-ray players or hi-fi components, tablets and digital photo frames, as well as electric household equipment, smart electric meters, and remote monitoring devices.

The Internet connection allows these devices to access new services and content, benefit from remote updates, and provide information on their use.

In particular, it becomes possible to use the connected devices to broadcast targeted content as a supplement to the usual broadcast channels comprising personal computers or smartphones. Furthermore, these devices may be provided with "sensors" that can be used to select the content based on events detected during their operation.

For example, a television can record information on the type of content (channel, program, film) viewed by the user, a hi-fi component may know the user's musical taste, a smart electric meter can record the consumption history of electric devices, a refrigerator can prepare an inventory of stored products, a coffeemaker can indicate when the reserve is empty. This information can be used to perform actions making it possible to provide targeted contextual information to the user, for example targeted information for additional video content, a music album, an electricity offer adapted to the household's consumption, a promotional offer for a food product, or a coffee refill.

The primary application of the broadcast of targeted content is the possibility of transmitting information according to the user's context, at the very moment when an event is detected in the environment. This type of contextual information is already widely used on computers, with the broadcast of information according to searches done by the user on his search engine or the history of sites visited, and on mobile telephones, with the broadcast of mobile information according to the user's location.

However, several problems arise in implementing this "home contextual information."

First of all, the connected devices do not all have functions making it possible to sense usage information and carry out corresponding actions, such as displaying information.

Some devices have advanced detection capacities (for example, an electric meter can provide information on the user's consumption habits, the type of devices connected to the electrical grid, or the need for maintenance), but most often have limited broadcast capacities; others, on the contrary, have expansive broadcast capacities, such as televisions or photo frames, but limited detection capacities.

Additionally, targeting may require the use of information from several devices that must be analyzed before being used.

Then, selecting the actions to be performed requires complex processing operations that may exceed the capacities of the connected objects.

The performance of the selected actions may also require capacities using more than one device.

Furthermore, selecting information based on events detected by home objects poses problems in terms of protecting user's privacy.

In fact, the direct transmission of the data supplied by the objects connected to a remote server responsible for analyzing them, without the user having means of monitoring the transmitted information, runs the risk of that data being used inappropriately, while its storage outside the user's control contravenes the principles of protection of and access to private data.

Lastly, when a piece of information triggers a transaction for a service, it must be possible to determine all of the events that led to that transaction so as to remunerate the various operators and improve the targeting process.

The current solutions to this problem fall into several categories. Each device having connected functions is most often connected to a dedicated service platform operated by the manufacturer, which will be responsible for receiving information from the device. This platform may also be used to broadcast information related to the received information, either via the device itself, or using a device of the computer, tablet, or smartphone type.

Another solution is the use of a controlled relay device by a third party operator, such as a box ADSL or a smart electric meter, to monitor the devices within the home network (electric grid or local network), detect events, and escalate them to a central server. That server will be responsible for analyzing them and initiating a broadcast of information by means of a device of the computer, tablet, or smartphone type.

Lastly, a final solution comprises incorporating, on a smart terminal of the computer, tablet, or smartphone type, sensors or relays making it possible to communicate directly with each connected device. Upon request by the user, the smart terminal can read information on each home network device, notify a server that returns corresponding information to it, and display that information instantaneously on the screen of the terminal.

Each solution currently proposed has its own limitations. Using a separate platform for each connected device makes it impossible to combine information coming from several devices to make the information more targeted. Furthermore, in the case where the device does not have broadcast functions, the broadcast of the information must be done using another channel, and requires that the user be connected on the platform or have previously entered his contact information thereon to be able to receive the supplied information.

The use of a relay device controlled by a third party, such as an ADSL box or a smart electric meter, requires that all of the connected devices, irrespective of their manufacturer, be capable of communicating with the relay device, using the same communication network and the same protocols. Then, the broadcasting requires a central server capable of recovering the information from each relay device, selecting the existing information to be broadcast, and broadcasting it, which may be very greedy in terms of performance-related consumption in the event a large number of users and devices is being managed. Lastly, broadcasting of the information requires that the user have a specific device or have previously entered his contact information to be able to receive the information provided.

In the various solutions currently proposed, the system is centralized and requires the use of a central server, generally connected to a single broadcast device, to which each device of the network must be connected and configured.

The proper operation of the system with its connected home network is therefore dependent on the proper configuration and proper operation of the central server and the connection of each device of the home network thereto.

The use of a terminal of the computer, tablet, or smartphone type to detect and select the information poses other problems. The device must have sensors or relays compatible with each connected device. The system only operates when the device is present and connected to the home network, which poses a problem in the case of a smartphone, which, by definition, is mobile, or a computer, which is not always turned on.

The user must first initialize the device before it detects an event and broadcasts associated content. The device also does not have access to events that may have been detected before it was initialized.

Lastly, irrespective of the selected solution, using a single centralized server outside the user's network to detect information in the area around the user and broadcast other information related thereto poses significant problems in terms of privacy protection. In fact, these methods lead to remote monitoring of the user, as well as storage on a remote server of the information continuously recovered from the user's network, then associating that information with the identity of the users so as to be able to target them. This means that these methods can easily be used inappropriately for harmful purposes, and contribute to hindering the adoption of these technologies by users concerned about protecting their privacy and security.

BRIEF SUMMARY

The present invention aims to resolve all or some of the aforementioned drawbacks.

To that end, the present invention relates to a system for broadcasting targeted information for a home network to which at least one electronic device including a processing means is connected, said broadcasting system including at least one detector agent for detecting a predefined event, said at least one detector agent being arranged on the at least one electronic device and being arranged to collect information generated by at least one physical sensor equipping the electronic device(s) following the detection of an event by the at least one physical sensor, to interpret that information using a local event database comprising a set of event definitions, to associate the event with an event data structure identified from among the set of event definitions, each being associated with a unique electronic event identifier, and to publish the electronic event identifier associated with the identified event in an event feed passing through the home network; at least one selector agent for selecting an action to be performed, the at least one selector agent being arranged on at least one electronic device and being arranged to collect the event feed passing through the home network, to interpret the electronic identifier associated with the identified event assimilated to the event feed using a local action database comprising a set of action definitions, to deduce therefrom the selection of an action from the set of action definitions as a function of the electronic identifier of the identified event, each being associated with a unique electronic action identifier, and to publish the electronic identifier associated with the selected action in an action feed passing through the home network; and at least one broadcasting agent for broadcasting targeted information content for an end user, the at least one broadcasting agent being arranged on at least one electronic device and being arranged to collect the action feed passing through the home network, to interpret the electronic action identifier associated with the selected action assimilated to the action feed, optionally using a local content database comprising a set of content definitions, to perform the action at a predetermined moment by broadcasting targeted information content according to the electronic identifier of the selected action to transmit the encrypted event, action, and content identifiers in the case of a transaction following the performance of the action, the detector, selector, and broadcasting agents performing tasks in separate execution contexts on processing means of the at least one electronic device connected to the home network.

This arrangement makes it possible to combine information coming from several devices to perform customized actions. The selector agents may use events coming from several event feeds produced by different detector agents asynchronously to select the actions to be performed, and the broadcasting agents may also combine actions coming from several action feeds to broadcast content by combining it with local content.

This arrangement also allows all of the "detector" devices, even those without broadcasting capacities, to be used to select content. The detector agents use the broadcasting agents to broadcast content, without requiring the presence of a central server responsible for recovering all of the events and initiating all of the actions, which is less costly in terms of server resources. This reduces prerequisites in terms of processing capacity for the detector agents, and therefore their cost, and eliminates the need for a central system for selecting and broadcasting content outside the user's network.

Furthermore, this arrangement eliminates the need to have a central device in the home network such as a computer, tablet, or smartphone, that must remain continuously connected to the home network. Several multifunctional devices may be used as the "selector agent," without requiring a broadcast capacity. This applies to "screenless" devices that are always active, such as Internet gateways (ADSL, optical fiber, cable) or smart electric meters.

According to one embodiment, the home network may be connected to at least one remote server by means of an outside network, such as the Internet, and the data related to the identified events, selected actions, and broadcast content is stored locally and communicated outside the home network, anonymously and encrypted upon action by the home network user, to at least one remote server.

According to one embodiment, the information contained in the local databases used by a first detector or selector agent is encrypted so as to prevent access to that information by a second selector or broadcasting agent arranged downstream of the first agent in a direction of communication of the data by the event feed and/or the action feed.

According to one embodiment, the local event and/or action and/or content database receive(s) regular updates from one or more remote event and/or action and/or content databases, respectively.

According to one embodiment, the local database(s) is (are) always connected to the remote database(s).

According to one embodiment, the remote databases are centralized in a single remote database.

According to one embodiment, the local databases are centralized in a single database.

According to one embodiment, one or all of the local databases are outside the home network.

According to one embodiment, the at least one detector, selector and broadcasting agents automatically connect to the external databases upon receipt of an event.

According to one embodiment, the events not identified by the at least one detector agent are published in a specific feed, indicating all of the information collected by the at least one detector agent for each unidentified event.

According to one embodiment, the specific feed is anonymously published upon authorization by the user at regular intervals to a remote database either by the detector agent, or by the selector agent.

According to one embodiment, the broadcasting agent, such as a mobile telephone, is located outside the home network, but is accessible through a public and shared network, such as a GSM network.

According to one embodiment, the at least one electronic device comprises compatible onboard software making it possible to exchange with at least one second electronic device.

According to one embodiment, the onboard software uses protocols of the XML/IP type based on the UPnP, XMPP, and Atom/RSS standards.

This arrangement allows the at least one electronic device to identify itself once it connects to the home network, and to thereby have an open system that easily makes it possible to add or remove agents of each type in a same network automatically using the "Plug & Play" procedure.

According to one embodiment, the at least one detector agent and the at least one selector agent each comprise a cache memory for the detected events and the actions to be performed, respectively.

This arrangement makes it possible to combine both the real-time and asynchronous execution. The agents that are not accessible when the notification is issued may thus find the last events and actions on their own initiative, for example when they are reconnected to the network.

This arrangement also allows the system to operate even when no Internet connection is available and to improve the reactivity of the system. In particular, this cache memory may be updated using technologies of the "broadcast" type (TV, radio, satellite, cable) without an Internet connection.

The present invention also relates to a method for broadcasting targeted information for a home network to which at least one electronic device is connected comprising processing means, said method including, in this order, the steps of inventorying the at least one electronic device the first time the at least one electronic device is activated and each time the electronic device is connected to/disconnected from the home network, identifying the at least one electronic device connected to the home network, detecting an event and identifying an event using at least one detector agent comprising collecting information generated by at least one physical sensor equipping the electronic device(s) following the detection of an event by the at least one physical sensor, interpreting that information using a local event database comprising a set of event definitions, associating the event with an event data structure identified from among the set of event definitions, each being associated with a unique electronic event identifier, and publishing the electronic event identifier associated with the identified event in an event feed passing through the home network; selecting an action using a selector agent comprising collecting the event feed passing through the home network, interpreting the electronic identifier associated with the identified event assimilated into the event feed using a local action database comprising a set of action definitions, deducing the selection of an action from the set of action definitions according to the electronic identifier of the identified event, each being associated with a unique electronic action identifier, and publishing the electronic identifier associated with the selected action in an action feed passing through the home network; broadcasting targeted information content to an end user using at least one broadcasting agent comprising collecting the action feed passing through the home network, interpreting the electronic action identifier associated with the selected action assimilated to the action feed, optionally using a local content database comprising a set of content definitions, and performing the action at a predetermined moment by broadcasting the targeted information content as a function of the electronic identifier of the selected action.

According to one alternative embodiment of the method, the step for broadcasting content to an end user using at least one broadcasting agent initiates a request to the at least one selector agent so that it updates its set of action definitions from one or more remote databases, then the at least one selector agent in turn initiates a request to the at least one detector so that it updates its set of event definitions from one or more remote databases.

According to one alternative embodiment of the method, the step for selecting an action using a selector agent initiates a request to the at least one detector for it to update its set of event definitions from one or more remote databases.

BRIEF DESCRIPTION OF THE DRAWINGS

In any case, the invention will be well understood using the following description in reference to the appended diagrammatic drawing, showing, as a non-limiting example, a broadcasting system according to the invention.

DETAILED DESCRIPTION

Tables providing examples of information exchanged between the various elements of the broadcasting system according to the invention are provided at the end of the description.

Figure 1:
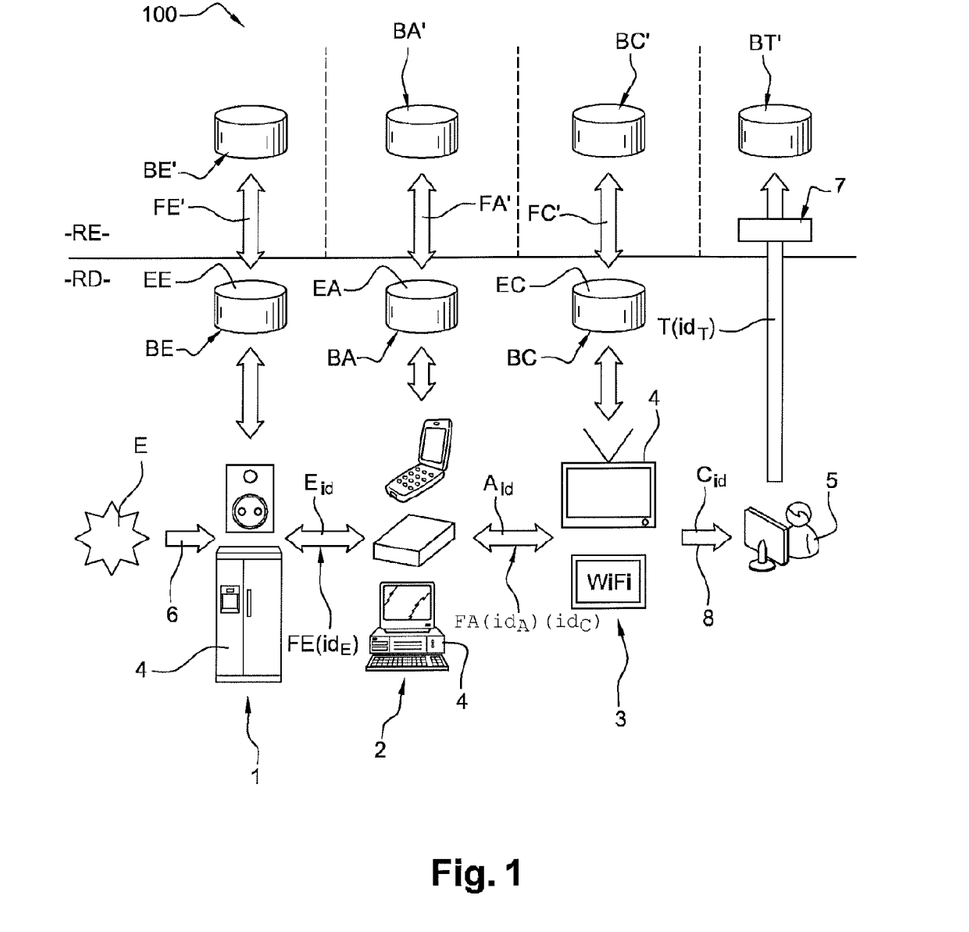
FIG. 1 is a block diagram of the broadcasting system according to one embodiment of the invention.

As illustrated in FIG. 1, the system 100 is based on the use of three types of agents located within a same home network RD.

A detector agent 1 recovers information 6 detected by physical sensors (operating message; electric, radio, light, sound signal) following an event E and interprets it using a local event database BE.

The local database BE identifies an identified event data structure $E_{id}$ from among the set EE of event definitions.

In the rest of the description, the identified event data structure $E_{id}$ will be designated as identified event $E_{id}$.

The detector agent 1 generates electronic identifiers $id_E$ of the identified events $E_{id}$ and publishes them in an event feed FE.

That agent 1 also stores the notification addresses for the selector agent 2.

The detector agent 1 can receive regular updates from the event database BE from one or more remote databases BE' through an update feed FE'.

There may be one or more detector agents within a same home network RD.

The event feed FE is received and analyzed by a selector agent 2, which deduces the actions to be performed $A_{id}$ therefrom using a local action database BA containing targeting rules, and broadcasts them in an action feed FA.

The local action database BA is regularly updated from one or more remote databases BA' through an update feed FA'.

The selector agents 2 keep the list of addresses of the event feeds FE to which they subscribe.

These agents 2 also store the notification addresses for the broadcasting agents 3.

There may be one or more selector agents 2 in a same home network RD.

The action feed FA is received and analyzed by a broadcasting agent 3, which performs the actions $A_{id}$ at the desired moment to broadcast the content 8, optionally using a local content database BC.

In this case, the local content database BC is updated regularly from one or more remote databases BC' through an update feed FC'.

The broadcasting agents 3 keep the list of addresses of the action feeds FA to which they subscribe.

There may be one or more broadcasting agents 3 in a same home network RD.

The broadcast content 8 may optionally trigger one or more transactions T by the user 5 from a simple information request to a purchase, which makes it possible to generate revenue.

Each initiated transaction T is associated with an identifier $id_T$ formed from event $id_E$, action $id_A$, and content $id_O$ identifiers having contributed to the initiation of the transaction T.

This identifier $id_T$ is stored by a remote transaction database BT' and is associated with the revenue resulting from the initiated transaction. A reconciliation agent is used a posteriori, making it possible to remunerate the various parties.

The three agents (detector 1, selector 2, broadcasting 3) are installed and operate within a home network RD of the user 5, locally store the generated information, perform the analyses using local databases BE, BA, BC, which update themselves regularly from remote databases BE', BA', BC'.

The updates are done anonymously; the information recovered during a transaction T is also anonymous and encrypted independently by each detector 1, selector 2, or broadcasting 3 agent.

The method according to the invention is based on the use of these detector 1, selector 2, or broadcasting 3 agents embodied by compatible electronic devices 4 that communicate using predefined protocols, based on standard Internet protocols typically used for communication between computers.

Several classes of agents are managed, an agent being able to be a dedicated physical piece of equipment or software installed on a multifunctional piece of equipment both comprising data processing means.

In one embodiment, each electronic device 4 is equipped with compatible onboard software making it possible to exchange with the other electronic devices 4 using protocols of the XML/IP type based on the UPnP and Atom/RSS standards.

Figure 2:
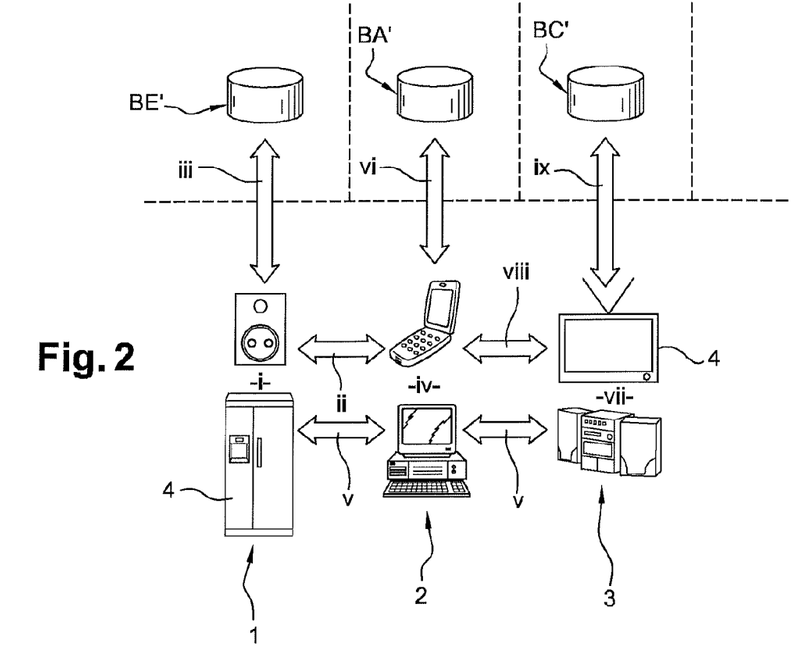
FIG. 2 is a block diagram illustrating the implementation of the so-called inventory step of the broadcasting method according to the invention.

One embodiment of a first step of the method according to the invention illustrated in FIG. 2, comprising taking an inventory of all of the electronic devices 4 connected to the home network RD, is carried out the first time the devices 4 are activated and upon each connection to or disconnection from the home network RD.

This step comprises several execution tasks listed below and referenced in FIG. 2.

(i): Upon each activation, the detector agent 1 inventories the available physical interfaces and the associated networks.

Then, for each network, the detector agent 1 defines whether it is a private network (which can be used to broadcast an event feed FE, update notifications with connection to the remote event database BE') or a public network (which may only be used to connect to the remote event database BE').

This choice is made automatically based on rules and may be modified manually.

The aforementioned rules may relate to the type of physical interface used, the presence of security measures such as encryption, or the use of a particular addressing scheme.

(ii): On each inventoried private network, the detector agent 1 broadcasts a notification using a specific protocol based on the uPnP protocol in order to signal itself to the other agents, by indicating its unique identifier, its class, its type, the supported protocols, the types of detectable events, the publication address where its event feed FE is published, and other optional parameters.

The selector agents 2 present on the same private network determine, according to the supplied information, whether they wish to subscribe to the event feed FE that the detector agent 1 is producing, according to their processing capacities and other parameters. The process is initiated each time agents are reconnected to the home network RD.

(iii): Optionally, on each inventoried private and public network, the detector agent 1 tries to connect to a remote event database BE' using an update feed FE' assuming the form of a connection of the http/IP type so as to update its local event database BE regularly.

The address of the remote event database BE' is pre-stored in the parameters of the device 4, and several addresses may be predefined. Upon response from the remote event database BE', the detector agent 1 provides its class, its type, and supported protocols.

If the remote event database BE' cannot respond to the request from the detector agent 1 due to incompatibility, it provides the detector agent 1 with another address to be used.

If, on the contrary, the remote event database BE' responds to the detector agent 1, it indicates the protocol versions to be used, the update address(es), the update frequency, and other optional parameters.

This information is stored by the detector agent 1, and no information on the detector agent 1 is stored by the remote event database BE'.

All exchanges between the detector agent 1 and the event database BE' are also encrypted so as to prevent the interception of the information and use a data exchange protocol of the XML/Atom type.

(iv): Optionally, if the detector agent 1 has functions making it possible to receive multicast content (TV, radio, satellite, cable), it connects on one or more predefined channels so as to receive updates regularly from the local event database BE from the remote database BE'.

(v): Likewise, upon each activation, the selector agent 2 inventories the available physical interfaces in the associated networks.

Then, for each network, the selector agent 2 defines whether it is a private network (which can be used to receive event notifications, broadcast action feeds, and connect to the remote action database BA') or a public network (which may only be used to connect to the remote action database BA').

This choice is made automatically based on rules, and may be modified manually.

The aforementioned rules may relate to the type of physical interface used, the presence of security measures such as encryption, or the use of a particular addressing scheme.

(vi): On each inventoried private network, the selector agent 2 broadcasts a notification using a specific protocol based on the uPnP protocol so as to signal itself to the other agents, by indicating a unique identifier, the class and the type of agent, the address of the action feed FA and the notification address where the new events can be indicated, the supported protocol versions, and other optional parameters.

Each detector agent 1 present stores the notification address of the selector agent 2 in a local database (not shown) so as to be able to notify it when the event feed FE is updated.

The broadcasting agents 3 present on the same private network determine, according to information provided, whether they wish to subscribe to the action feed FA of the selector agent 2, according to their processing capacities and other parameters.

The process is initiated each time selector agents 2 are reconnected to the home network RD.

(vii): On each inventoried private and public network, the selector agent 2 tries to connect to a remote action database BA' using an update feed FA' assuming the form of a connection of the http/IP type so as to update its local action database BA regularly.

The address of the remote action database BA' is pre-stored in the parameters of the device 4, and several addresses may be predefined.

Upon response from the remote action database BA', the selector agent 2 provides its class, its type, the types of events and actions supported (according to information recovered from the detector 1 and broadcasting 3 agents), as well as the supported protocol versions.

If the remote action database BA' cannot respond to the request from the selector agent 2 due to incompatibility, it provides the selector agent 2 with another address to be used.

If, on the contrary, the remote action database BA' responds to the selector agent 2, it indicates the versions of protocols to be used, the update address(es), the update frequency, and other optional parameters.

This information is stored by the selector agent 2; no information on the selector agent 2 is stored by the remote action database BA'.

Furthermore, all of the exchanges between the selector agent 2 and the action database BA' are encrypted so as to prevent interception of the information and use a data exchange protocol of the XML/Atom type.

(viii): Alternatively, if the selector agent 2 has functions making it possible to receive multicast content (TV, radio, satellite, cable), it connects on one or more predefined channels so as to receive updates regularly for the local action database BA from the remote database BA'.

(ix): Likewise, upon each activation, the broadcasting agent 3 inventories the available physical interfaces and the associated networks. Then, for each network, the agent defines whether it is a private network (which can be used to receive updates from the action feed FA and connect to the remote content database BC') or a public network (which can only be used to connect to the remote content database BC'). This choice is made automatically based on rules, and can be modified by manually.

The aforementioned rules may pertain to the type of physical interface used, the presence of security measures such as encryption, or the use of a particular addressing scheme.

(x): On each inventoried private network, the broadcasting agent 3 broadcasts a notification using a specific protocol based on the uPnP protocol in order to signal itself to the other agents, by indicating a unique identifier, the class and type of agent, the notification address of the actions, the supported protocol versions, the types of actions that can be executed, and other optional parameters.

Each selector agent 2 present stores the notification address of the broadcasting agent 3 in a local database (not shown) so as to be able to notify it when the action feed FA is updated.

(xi): Optionally, in the case where the broadcasting agent 3 is able to broadcast content 8 upon request, it is associated with a content database BC used to save content regularly found from one or more remote content databases BC' using a content feed FC' assuming the form of a connection of the http/IP type so as to update its local content database BC regularly.

The address of the remote content database BC' is pre-stored in the parameters of the device 4, and several addresses may be predefined. Upon response from the remote content database BC', the broadcasting agent 3 provides its class, its type, and the supported protocols.

If the database cannot respond to the request from the broadcasting agent 3 due to incompatibility, it provides the broadcasting agent 3 with another address to be used.

If, on the contrary, the remote content database BC' responds to the broadcasting agent 3, it indicates the protocol versions to be used, the update address(es), the update frequency, and other optional parameters.

This information is stored by the broadcasting agent 3, and no information on the broadcasting agent 3 is stored by the remote content database BC'.

All of the exchanges between the broadcasting agent 3 and the remote content database BC' are also encrypted so as to prevent the interception of information and use a data exchange protocol of the XML/Atom type.

Figure 3:
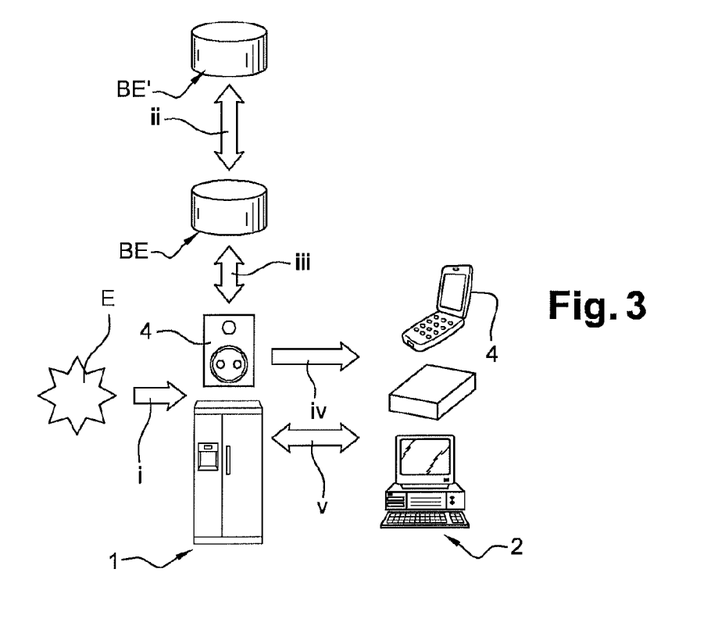
FIG. 3 is a block diagram illustrating the implementation of a so-called event detection and identification step of the broadcasting method according to the invention.

FIG. 3 illustrates a second so-called detection and interpretation step of the method according to the invention.

This detection and interpretation step is carried out upon the detection of an event E by a detector agent 1.

This step comprises several execution tasks listed below and referenced in FIG. 3.

(i): This step is initiated upon receipt of information 6 from sensors connected to the detector agent 1. This receipt may be initiated by an initiating event E or at the initiative of the detector agent 1 itself.

(ii): The detector agent 1 can optionally connect to the remote event database BE', using the protocol of the Atom/RSS type, so as to update its local event database BE proactively. No information on the detector agent 1 is kept by the remote database BE'.

(iii): The information recovered, stored in the form of manipulable files, is analyzed by the detector agent 1 using the local event database BE so as to translate it into an identified event $E_{id}$ comprised in a set EE of event definitions according to a predefined nomenclature.

(iv): Once the event $E_{id}$ is identified, the detector agent 1 updates the event feeds FE by indicating the identifier $id_E$ and the type of event, plus additional variables.

The detector agent 1 integrates certain data from sensors used to identify the event E as well as its model identifier $id_E$ (generic); this information is encrypted using a key provided by the remote event database BE' and incorporated into the event feed FE.

The event feed FE is stored in the form of a file of the RSS/XML type. The detector agent 1 then notifies all of the pre-recorded selector agent(s) 2 of the update to the event feed FE through a request of the HTTP/XML type at their notification address.

(v): Following receipt of the update notification, or at its own initiative, each subscribed selector agent 2 connects to the event feed FE by means of an HTTP-type request so as to recover the information on the last detected event(s) $E_{id}$.

Figure 4:
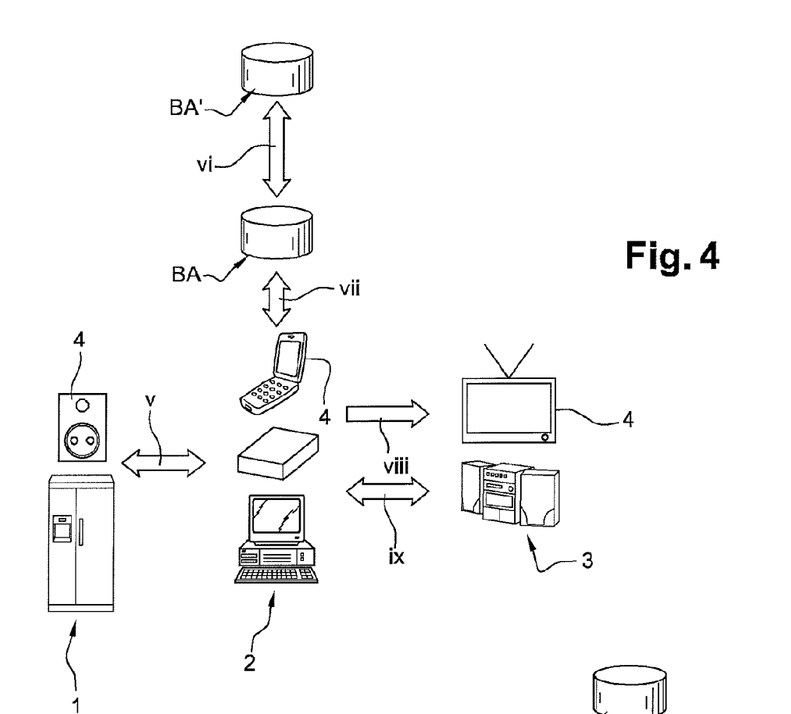
FIG. 4 is a block diagram illustrating the implementation of a so-called action selection step of the broadcasting method according to the invention.

FIG. 4 illustrates a third so-called broadcasting step of the method according to the invention.

This step is carried out following the receipt of an update notification of an event feed FE by a selector agent 2.

This step comprises several execution tasks listed below and referenced in FIG. 4, some being shared with the execution tasks of the previous step.

(v): The selector agent 2 connects to the event feed(s) to which it is subscribed so as to recover the information on the last detected event(s) using a request of the HTTP type. The data is returned to it in the form of an RSS/XML type file.

(vi): Optionally, following the reading of a new event $E_{id}$ in any event feed FE, the selector agent 2 connects to the remote action database BA' so as to update the local database BA containing the sets of rules using a request of the HTTP(s) type.

(vii): The sets of rules are then evaluated by the selector agent 2 using the variables provided by the detector agent 1 in the event feed FE, the information stored by the selector agent 2, and optionally user preferences.

Each rule contains a list of conditions that the event $E_{id}$ must satisfy and in light of a set EA of action definitions to be executed. The rule may apply to one or more events $E_{id}$ coming from one or more detector agents 1.

For each action to be executed, a type is also provided as well as variables that will be determined by the selector agent 2 based on information stored in the event feed FE or information stored locally (such as the content or the user's personal data).

(viii): Once the list of actions to be executed is determined, the selector agent 2 marks the event(s) $E_{id}$ as "processed" and updates the action feed FA.

For each action, it incorporates the identifiers $id_E$ of the events used to select the action $A_{id}$ as well as its model identifier $id_A$ (generic).

This information is encrypted using a key provided by the remote action database BA' used. The action feed FA is stored in the form of a file of the RSS/XML type.

The selector agent 2 then notifies all of the prerecorded broadcasting agents 3 of the update through a request of the http/XML type at their notification address.

(ix): Following receipt of the update notification, or at its own initiative, each broadcasting agent 3 connects to the action feed FA by an http request so as to recover the information on the last action(s) $A_{id}$ to be executed.

Figure 5:
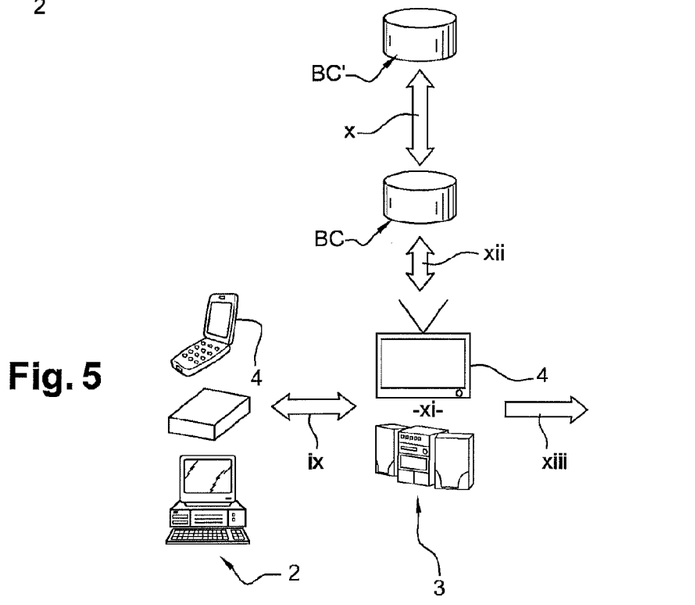
FIG. 5 is a block diagram illustrating the implementation of a so-called broadcasting step for broadcasting content to an end user of the broadcasting method according to the invention.

FIG. 5 illustrates a fourth so-called broadcasting step of the method according to the invention.

This step is carried out following receipt of an update notification of an action feed FA by a broadcasting agent 3.

This step comprises several execution tasks listed below and referenced in FIG. 5, some being shared with the execution tasks of the previous step.

(ix): The broadcasting agent 3 connects to the action feed (s) FA to which it subscribes so as to recover the information on the last action(s) to be executed using a request of the http type. The data is returned to it in the form of a file of the RSS/XML type.

(x): Optionally, the broadcasting agent 3 can connect to a remote content database BC' so as to update the local database BC using a request of the http(s) type.

(xi): Following the detection of one or more new actions $A_{id}$ to be executed, the broadcasting agent 3 plans its execution.

It verifies that another identical or contradictory action $A_{id}$ is not planned at the same moment. Depending on the capacities of the broadcasting agent 3, these tasks are performed upon receipt of the actions $A_{id}$ or when they are executed.

(xii): Optionally, the broadcasting agent 3 can connect to a local content database BC so as to find content therein to be used to execute the actions $A_{id}$.

The identifier $id_C$ of the content or the feed to be used is found in the variables associated with the action $A_{id}$ to be executed transmitted in the action feed FA.

(xiii): At the planned moment, the broadcasting agent 3 performs the program action $A_{id}$ with its parameters.

The action $A_{id}$ may be of multiple types depending on the capacities of the broadcasting agent 3: selection of a particular channel in the case of a device 4 having functions making it possible to receive multicast content 8 (TV, radio, satellite, cable), broadcasting of content 8, display of a dialogue with the user 5, execution of an application, etc.

Once the action $A_{id}$ is performed, the broadcasting agent 3 marks it as processed.

Figure 6:
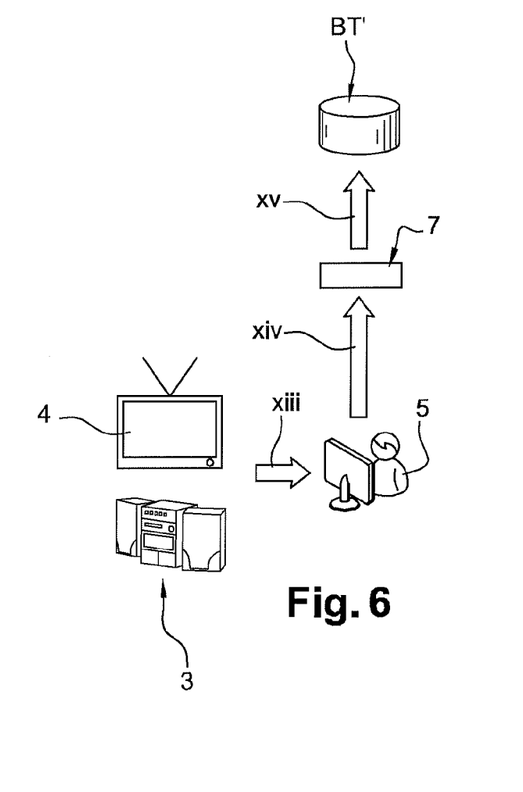
FIG. 6 is a block diagram illustrating a so-called transaction step that may be implemented following the implementation of the broadcasting method according to the invention.

The targeted information broadcasting method according to the invention may lead to additional transactions T for a service illustrated in FIG. 6.

This step is carried out after the execution of an action $A_{id}$ by a broadcasting agent 3.

This step comprises several execution tasks listed below and referenced in FIG. 6.

(xiv): During the execution of the action $A_{id}$ by the broadcasting agent 3, the user 5 can choose to initiate a transaction T on an external transaction system 7 (operated by a third party) and referenced in the parameters of the action, for example a website.

The address of this transaction system 7 is associated with the broadcast content 8, in the form of a URL hypertext link, for example.

Upon connection, the information on the executed action $A_{id}$ is also sent to the transaction system 7.

This includes the identifiers of the content $id_C$ and actions $id_A$ that were used as well as the model identifier $id_E$ (generic). This information is encrypted using a key provided by the content database BC' used.

The initiation of the transaction T may also be recorded as an event E so as to be reused by the system 100 to select other actions $A_{id}$.

(xv): The transaction system 7 sends the remote transaction database BT' the details of the transaction T as well as the data for the executed action $A_{id}$.

(xvi): The remote transaction database BT' calculates, from the supplied elements, the amount due by the third party operating the transaction system 7 for that transaction T.

This amount may be a fixed fee per transaction T, a percentage of the amount generated by the transaction T, etc.

(xvii): The remote transaction database BT' uses the identifiers of the agents associated with the transaction T to calculate the portion of the revenue from the transaction T due to each protagonist according to predefined rules.

Figure 7:
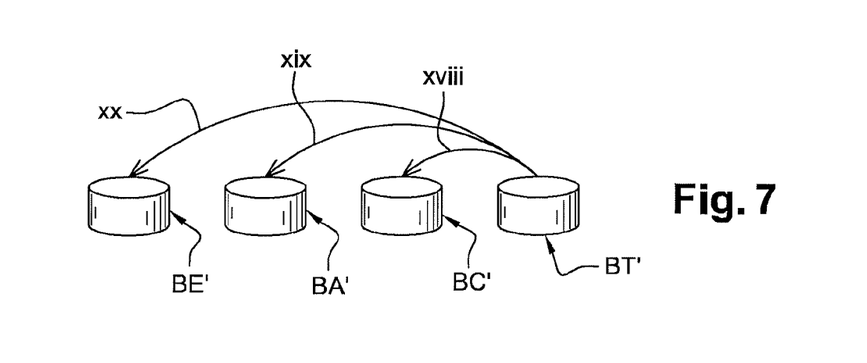
FIG. 7 is a block diagram of a so-called reconciliation step that may be implemented in parallel with the broadcasting method according to the invention.

Lastly, the targeted information broadcasting method according to the invention can lead to a final additional step, called a reconciliation step, illustrated in FIG. 7.

This step is executed at regular intervals at the initiative of the remote transaction database BT'.

This step comprises several execution tasks listed below and referenced in FIG. 7.

(xviii): The remote transaction database BT' sends each identified remote content database BC' (using database identifiers provided in each transaction T) a statement summarizing the revenues generated over the elapsed period for each type of broadcasting agent 3 and each content identifier $id_C$.

After decrypting the information using a unique key, each remote transaction database BT' uses that information to remunerate the intermediaries (e.g., content suppliers, manufacturers or operators of broadcasting devices).

(xix): The remote transaction database BT' sends each identified remote action database BA' (using database identifiers provided in each transaction T) a statement summarizing the revenue generated over the elapsed period for each type of selector agent 2 and each action identifier $id_A$.

After decrypting the information using a unique key, each remote transaction database BT' uses this information to remunerate the intermediaries (e.g., manufacturers or operators of selector devices).

(xx): The remote transaction database BT' sends each remote event database BE' (using database identifiers provided in each transaction T) a statement summarizing the revenue generated over the elapsed period for each type of detector agent 1 and each event identifier $id_E$.

After decrypting the information using a unique key, each remote transaction database BT' uses this information to remunerate the intermediaries (e.g., manufacturers or operators of detector devices).

Thus, the primary interest of the method related to the usage is the protection of privacy, which is ensured on several levels.

The remote databases do not store any information on the user 5 for the devices 4 used; they operate in a "passive" mode and are queried by the home agents at regular intervals, based on the update model for Internet-based update feeds.

The databases outside the home network RD do not know the identity of the agents of the home network RD, and cannot determine which event $E_{id}$, action $A_{id}$ or content $C_{id}$ was actually processed during a broadcast for a particular user 5.

In the case of devices 4 having multicast functions, the updates are downloaded without any connection of the local agents to the remote database.

All of the data related to the identified events $E_{id}$ and the executed actions $A_{id}$ is stored locally and is only communicated outside the home network RD in case of a transaction T, upon action by the user 5.

Furthermore, each downstream agent cannot access the information used by an upstream agent, the information being encrypted.

The detector agent 1 does not have access to the stored data of the user 5 and can only use the data from received events E to identify it, using a local database BE.

The transmitted information from the sensors is encrypted and can only be interpreted by the corresponding event database BE'.

The information outlined on the detected events $E_{id}$ as well as the history are not transmitted by the selector agent 2.

All of the selection rules for the actions $A_{id}$ are executed locally. The information transmitted on the actions is encrypted and can only be interpreted by the corresponding action database BA'.

The broadcasting agent 3 cannot access the initial event data E that led to the choice to broadcast the targeted information 8 or the rules that were used to select the broadcast of the targeted information 8, which is encrypted.

The information transmitted outside the home network RD is not personal and does not make it possible to determine which specific agent or user 5 generated it.

It is aggregated by the remote transaction database BT' and encrypted so as only to be able to be interpreted by the corresponding databases.

Although the invention has been described relative to specific examples and embodiments, it is of course in no way limited thereto, and on the contrary encompasses all technical equivalents of the described steps and means.

The following information is provided by the agent 1 to the selector agent(s) 2 using a file of the XML type:

| Information | Description | Example |
| --- | --- | --- |
| Class | Detector agent | "detector" |
| Protocol | Version of the protocol, including the nomenclature of types, events, and actions | "version 1.0" |
| Type | Type of agent, defining the capacities of the agent broadly speaking | "audio" |
| Events | Types of events that can be detected. | "sound," "music," "radio" |
| Address of the feed | Address where the event feed is published by the detector agent | "http://192.168.1.22/eventFeed" |

The following information may optionally be provided by the detector agent 1 to the remote event database BE' so as to receive the updates for the local event database BE using a file of the XML type:

| Information | Description | Example |
| --- | --- | --- |
| Class | Detector agent | "detector" |
| Protocol | Version of the protocol, including the nomenclature of types, events, and actions and the exchange protocols between agents | "version 1.0" |
| Type | Type of agent, defining the capacities of the agent broadly speaking | "audio" |
| Events | Types of events that can be detected. | "sound," "music," "radio" |

The following information is returned by the remote event database BE' depending on the types of events that may be detected using a file of the XML type:

| Information | Description | Example |
| --- | --- | --- |
| Address 1 | Address where the updates of the local event database are published | "https://update1.serveur.net/var1" |
| Frequency | Update frequency | 1 hour |
| Encryption keys | Encryption keys to be used with the information provided by the remote event database | {key} |
| Database ID | Unique identifier of the local event database | event1 |

-continued

| Information | Description | Example |
|---|---|---|
| Address n | Address where the updates for the local event database are published | "https://updaten.serveur.net/var2" |
| Frequency | Update frequency | 1 hour |
| Encryption keys | Encryption keys to be used with the information provided by the remote event database | {key} |
| Database ID | Unique identifier of the local event database | eventn |

Subsequently, the detector agent 1 regularly updates the local event database BE by connecting to the addresses provided by the remote database BE' at the indicated frequencies, using a protocol of the Atom/RSS type. The local event database BE can also be updated during the operation of the detector agent 1.

The following information is provided by the selector agent 2 to the broadcasting agents 3 using a file of the XML type:

| Information | Description | Example |
|---|---|---|
| Class | Selector agent | "selector" |
| Protocol | Version of the protocol, including the nomenclature of types, events, and actions and the exchange protocols between agents | "version 1.0" |
| Type | Type of agent, defining the capacities of the agent broadly speaking | "multifunctional" |
| Address of the feed | Address where the event feed is published by the selector agent | "http://192.168.1.23/actionFeed" |

The following information is provided by the selector agent 2 to the detector agents 1 in order to receive the update notifications for the event feeds FE using a file of the XML type:

| Information | Description | Example |
|---|---|---|
| Class | Selector agent | "selector" |
| Protocol | Version of the protocol, including the nomenclature of types, events, and actions and the exchange protocols between agents | "version 1.0" |
| Type | Type of agent, defining the capacities of the agent broadly speaking | "multifunctional" |
| Notification address | Address where the detector agent can notify the selector agent of a new event | "http://192.168.1.23/eventNotif" |

The following information is provided by the selector agent 2 to the remote action database BA' so as to receive the updates for the local action database BA using a file of the XML type:

| Information | Description | Example |
|---|---|---|
| Class | Selector agent | "selector" |
| Protocol | Version of the protocol, including the nomenclature of types, events, and actions and the exchange protocols between agents | "version 1.0" |
| Type | Type of agent, defining the capacities of the agent broadly speaking | "multifunctional" |
| Events | Types of events that can be detected, based on the types supported by the event feeds to which the selector agent subscribes. | "sound," "music," "radio" |
| Actions | Types of actions that can be executed, based on the types supported by the broadcasting agents that subscribe to the action feed | "sound" "video" "TV" |

The following information is returned by the remote action database BA' according to the types of events and actions supported using a file of the XML type:

| Information | Description | Example |
|---|---|---|
| Address 1 | Address where the updates of the database are published | "https://update1.serveur.net/var1" |
| Frequency | Update frequency | 1 hour |
| Encryption keys | Encryption keys to be used with the information provided by the database | {key} |
| Database ID | Unique identifier of the action database | action1 |
| Address n | Address where the updates for the database are published | "https://updaten.serveur.net/var2" |
| Frequency | Update frequency | 1 hour |
| Encryption keys | Encryption keys to be used with the information provided by the database | {key} |
| Database ID | Unique identifier of the action database | actionn |

Subsequently, the selector agent 2 regularly updates the local action database BA by connecting to the addresses provided by the remote database BA' at the indicated frequencies, using a protocol of the Atom/RSS type.

The following information is provided by the broadcasting agent 3 to the selector regions 2 in order to receive the update notifications for the action scenes FA using a file of the XML type:

| Information | Description | Example |
|---|---|---|
| Class | Broadcasting agent | "broadcasting" |
| Protocol | Version of the protocol, including the nomenclature of types, events, and actions and the exchange protocols between agents | "version 1.0" |
| Type | Type of agent, defining the capacities of the agent broadly speaking | "video" |
| Actions | Types of actions that can be executed | "sound" "video" "TV" |
| Notification address | Address where the detector agent can notify the selector agent of a new action | "http://192.168.1.23/actionNotif" |

The following information may optionally be provided by the broadcasting agent 3 to the remote content database BC' so as to receive the updates for the local content database BC using a file of the XML type:

| Information | Description | Example |
| --- | --- | --- |
| Class | Broadcasting agent | "broadcasting" |
| Protocol | Version of the protocol, including the nomenclature of types, events, and actions and the exchange protocols between agents | "version 1.0" |
| Type | Type of agent, defining the capacities of the agent broadly speaking | "video" |
| Actions | Types of actions that can be executed | "sound" "video" "TV" |

The following information is returned by the remote content database BC' based on the information provided using a file of the XML type:

| Information | Description | Example |
| --- | --- | --- |
| Address 1 | Address where the updates of the database are published | "https://update1.serveur.net/var1" |
| Frequency | Update frequency | 1 hour |
| Encryption keys | Encryption keys to be used with the information provided by the database | {key} |
| Database ID | Unique identifier of the action database | content1 |
| Address n | Address where the updates for the database are published | "https://updaten.serveur.net/var2" |
| Frequency | Update frequency | 1 hour |
| Encryption keys | Encryption keys to be used with the information provided by the database | {key} |
| Database ID | Unique identifier of the action database | contentn |

The following information may be provided by the detector agent 1 for each event recorded in the event feed FE; the format of the feed is of the XML/RSS type.

| Information | Description | Example |
| --- | --- | --- |
| Protocol | Version of the protocol, including the nomenclature of types, events, and actions and the exchange protocols between agents | "version 1.0" |
| Timestamp | Date and time of the event | "2010-03-15 20:05:15 GMT" |
| Event | Type of event detected | "device_on" |
| Event identifier | Identifier of the detected event, generated by the event database, which can be interpreted by the selector agent | "XX-121-3338" |
| Event variables | Variables associated with the event | "heater," "30 min," "priority 1" |
| Detector agent ID (encrypted) | Model of the detector agent, used during the reconciliation phase | "ba283ebd5467578484f3194e29a7bcfb" |
| Sensor identifiers (encrypted) | Information used to detect the event, encrypted by the detector agent using the key of the event database having provided the identification rules used. | "ba283ebd5467578484f3194e29a7bcfb" |
| Database ID | Identifier of the event database used | event1 |

The following information may be provided by the selector agent 2 to the broadcasting agents 3 for each action indicated in the action feed FA; the format of the feed is of the XML/RSS type.

| Information | Description | Example |
| --- | --- | --- |
| Protocol | Version of the protocol, including the nomenclature of types, events, and actions and the exchange protocols between agents | "version 1.0" |
| Timestamp | Date and time of the event | "2010-03-15 20:05:15 GMT" |
| Action | Type of action to be executed | "playvideo" |
| Action identifier | Identifier of the action to be executed generated by the action database, which may be interpreted by the broadcasting agent | "REET-TTR21" |
| Action variables | Variables associated with the action, including the execution date, priority, scenario in case of error, address of the associated transaction agent. | "12," "20:35," "Priority 1" |
| Selector agent ID (encrypted) | Model of the selector agent, used during the reconciliation phase | "ba283ebd5467578484f3194e29a7bcfb" |
| Events (encrypted) | Type of the detected event(s) having made it possible to initiate the action | "ba283ebd5467578484f3194e29a7bcfb" |

| Information | Description | Example |
| --- | --- | --- |
| Event identifier (encrypted) | Identifier of the detected event(s) having made it possible to initiate the action | "ba283ebd5467578484f3194e29a7bcfb" |
| Database ID | Identifier of the action database used | action1 |
| Detector agent ID(s) (encrypted) | Model of the detector agent(s) having made it possible to initiate the action, used during the reconciliation phase | "ba283ebd5467578484f3194e29a7bcfb" |
| Sensor identifiers (encrypted) | Information used to detect the event | "ba283ebd5467578484f3194e29a7bcfb" |
| Database ID | Identifier of the event database used | event1 |

The following information is provided to the transaction system 7 by the broadcasting agent 3 as variables associated with the user's request:

| Information | Description | Example |
| --- | --- | --- |
| Broadcasting agent ID (encrypted) | Model of the broadcasting agent having executed the action that made it possible to initiate the transaction | "ba283ebd5467578484f3194e29a7bcfb" |
| Content (encrypted) | Type of broadcast content | "ba283ebd5467578484f3194e29a7bcfb" |
| Content identifier (encrypted) | Identifier of the broadcast content generated by the content database (optional) | "ba283ebd5467578484f3194e29a7bcfb" |
| Action (encrypted) | Type of action executed that made the transaction possible | "ba283ebd5467578484f3194e29a7bcfb" |
| Action identifier (encrypted) | Identifier of the executed action | "ba283ebd5467578484f3194e29a7bcfb" |
| Database ID | Identifier of the content database used | content1 |
| Selector agent ID (encrypted) | Model of the selector agent(s) having made it possible to select the action | "ba283ebd5467578484f3194e29a7bcfb" |
| Event (encrypted) | Type of the detected event(s) having made it possible to initiate the action | "ba283ebd5467578484f3194e29a7bcfb" |
| Event identifier (encrypted) | Identifier of the detected event(s) having made it possible to initiate the action | "ba283ebd5467578484f3194e29a7bcfb" |
| Database ID | Identifier of the action database BA used | action1 |
| Detector agent ID (encrypted) | Model of the detector agent(s) having made it possible to initiate the action | "ba283ebd5467578484f3194e29a7bcfb" |
| Sensor identifiers (encrypted) | Information used to detect the event | "ba283ebd5467578484f3194e29a7bcfb" |
| Database ID | Identifier of the event database used | event1 |

The following information is provided by the transaction agent (1, 2 or 3) to the remote transaction database BT' for each transaction T done in XML format:

| Information | Description | Example |
| --- | --- | --- |
| Timestamp | Date and time of the event | "2010-03-15 20:05:15 GMT" |
| Transaction system identifier | Identifier of the transaction system having performed the transaction | "123 régie" |
| Transaction identifier | Unique transaction identifier | "XX-7448-22222" |
| Transaction details | Transaction details, making it possible to calculate the revenue generated | CPC-€0.6 |

-continued

| Information | Description | Example |
|---|---|---|
| Broadcasting agent ID (encrypted) | Model of the broadcasting agent having executed the action that made it possible to initiate the transaction | "ba283ebd5467578484f3194e29a7bcfb" |
| Content (encrypted) | Type of broadcast content | "ba283ebd5467578484f3194e29a7bcfb" |
| Content identifier (encrypted) | Identifier of the broadcast content generated by the content database (optional) | "ba283ebd5467578484f3194e29a7bcfb" |
| Action (encrypted) | Type of action executed that made the transaction possible | "ba283ebd5467578484f3194e29a7bcfb" |
| Action identifier (encrypted) | Identifier of the executed action | "ba283ebd5467578484f3194e29a7bcfb" |
| Database ID | Identifier of the content database used | content1 |
| Selector agent ID (encrypted) | Model of the selector agent(s) having made it possible to select the action | "ba283ebd5467578484f3194e29a7bcfb" |
| Event (encrypted) | Type of the detected event(s) having made it possible to initiate the action | "ba283ebd5467578484f3194e29a7bcfb" |
| Event identifier (encrypted) | Identifier of the detected event(s) having made it possible to initiate the action | "ba283ebd5467578484f3194e29a7bcfb" |
| Database ID | Identifier of the action database used | action1 |
| Detector agent ID (encrypted) | Model of the detector agent(s) having made it possible to initiate the action | "ba283ebd5467578484f3194e29a7bcfb" |
| Sensor identifiers (encrypted) | Information used to detect the event | "ba283ebd5467578484f3194e29a7bcfb" |
| Database ID | Identifier of the event database used | event1 |

The invention claimed is:

1. A system for broadcasting targeted information for a home network, said broadcasting system comprising:
   the home network comprising:
      a local event database,
      a local action database, and
      a local content database; and
   at least one electronic device connected to the home network, the at least one electronic device further including:
      at least one detector detecting a predefined event, said at least one detector being arranged to:
         collect information generated by at least one physical sensor equipping the electronic device(s) following the detection of an event by the at least one physical sensor,
         interpret the collected information by using the local event database comprising a set of event definitions,
         associate the event with an event data structure identified from among the set of event definitions, each being associated with a unique electronic event identifier, and
         publish the electronic event identifier associated with the identified event in an event feed passing through the home network;
      at least one selector selecting an action to be performed, the at least one selector being arranged to:
         collect the event feed passing through the home network,
         interpret the electronic identifier associated with the identified event assimilated to the event feed by using the local action database comprising a set of action definitions,
         select an action from the set of action definitions as a function of the electronic identifier of the identified event, each being associated with a unique electronic action identifier, and
         publish the electronic identifier associated with the selected action in an action feed passing through the home network; and
      at least one broadcaster broadcasting targeted information content for an end user, the at least one broadcaster being arranged to:
         collect the action feed passing through the home network,
         interpret the electronic action identifier associated with the selected action assimilated to the action feed, optionally by using a local content database comprising a set of content definitions,
         perform the action at a predetermined moment by broadcasting targeted information content according to the electronic identifier of the selected action,
         transmit the encrypted event identifier, action identifier, and content identifier in the case of a transaction T following the performance of the action,
      the detector, selector, and broadcaster performing tasks in separate execution contexts on the processor of the at least one electronic device connected to the home network.

2. The broadcasting system according to claim 1, wherein the home network is connectable to at least one remote server via an outside network, and the identified events' data, selected actions' data, and broadcast content's data is stored locally and communicated outside the home network, anonymously and encrypted upon action by the home network user, to at least one remote server.

3. The broadcasting system according to claim 1, wherein the collected information contained in the local databases used by a first detector or selector is encrypted and the local databases prevents access to that information by a second selector or broadcaster arranged downstream of the first detector or selector in a direction of communication of the data by the event feed and/or the action feed.

4. The broadcasting system according to claim 1, wherein the local event and/or action and/or content database receive(s) regular updates from one or more remote event and/or action and/or content databases, respectively.

5. The broadcasting system according to claim 4, wherein the local database(s) is (are) always connected to the remote database(s).

6. The broadcasting system according to claim 1, wherein one or all of the local databases are outside the home network.

7. The broadcasting system according to claim 6, wherein the at least one detector, selector and broadcaster automatically connect to the external databases upon receipt of an event.

8. The broadcasting system according to claim 1, wherein unidentified events, which are not identified by the at least one detector, are published in a specific feed, the specific feed indicating all of the information collected by the at least one detector for each of the unidentified events.

9. The broadcasting system according to claim 8, wherein the specific feed is anonymously published upon authorization by the user at regular intervals to a remote database either by the detector, or by the selector.

10. The broadcasting system according to claim 1, wherein the broadcaster is located outside the home network, but is accessible through a public and shared network.

11. The broadcasting system according to claim 1, wherein the at least one detector and the at least one selector each comprise a cache memory for the detected events and the actions to be performed, respectively.

12. A method for broadcasting targeted information for a home network,
the home network comprising:
a local event database,
a local action database, and
a local content database;
the home network connected to at least one electronic device,
the method comprising:
inventorying the at least one electronic device the first time the at least one electronic device is activated and each time the electronic device is connected to/disconnected from the home network,
identifying the at least one electronic device connected to the home network,
detecting an event and identifying an event using at least one detector agent comprising:
collecting information generated by at least one physical sensor equipping the electronic device(s) following the detection of an event by the at least one physical sensor,
interpreting that information using a local event database comprising a set of event definitions,
associating the event with an event data structure identified from among the set of event definitions, each being associated with a unique electronic event identifier, and
publishing the electronic event identifier associated with the identified event in an event feed passing through the home network,
selecting an action using a selector agent comprising:
collecting the event feed passing through the home network,
interpreting the electronic identifier associated with the identified event assimilated into the event feed using a local action database comprising a set of action definitions,
deducing the selection of an action from the set of action definitions according to the electronic identifier of the identified event, each being associated with a unique electronic action identifier, and
publishing the electronic identifier associated with the selected action in an action feed passing through the home network,
broadcasting targeted information content to an end user using at least one broadcasting agent comprising:
collecting the action feed passing through the home network,
interpreting the electronic action identifier associated with the selected action assimilated to the action feed, optionally using a local content database comprising a set of content definitions, and
performing the action at a predetermined moment by broadcasting the targeted information content as a function of the electronic identifier of the selected action.

13. The broadcasting method according to claim 12, wherein the broadcasting of the targeted information content to the end user using the at least one broadcaster initiates a request to the at least one selector to update the set of action definitions from one or more remote databases, and in response to the broadcasting of the targeted information content the at least one selector in turn initiates a request to the at least one detector to update the set of event definitions from one or more remote databases.

14. The broadcasting method according to claim 12, wherein the step for selecting an action using a selector initiates a request to the at least one detector for it to update its set of event definitions from one or more remote databases.

* * * * *